United States Patent
Kagoura

(10) Patent No.: US 8,789,562 B2
(45) Date of Patent: Jul. 29, 2014

(54) FLEXIBLE TUBE FOR TRANSPORTING CRYOGENIC FLUID AND STRUCTURE FOR DETECTING LEAKAGE OF FLUID IN TUBE

(75) Inventor: Toru Kagoura, Ichihara (JP)

(73) Assignees: Furukawa Electric Co., Ltd, Tokyo (JP); Japan Oil, Gas and Metals National Corporation, Kawasaki (JP)

( * ) Notice: Subject to any disclaimer, the term of this patent is extended or adjusted under 35 U.S.C. 154(b) by 988 days.

(21) Appl. No.: 12/922,572

(22) PCT Filed: Mar. 9, 2009

(86) PCT No.: PCT/JP2009/054453
§ 371 (c)(1),
(2), (4) Date: Sep. 14, 2010

(87) PCT Pub. No.: WO2009/119296
PCT Pub. Date: Oct. 1, 2009

(65) Prior Publication Data
US 2011/0017337 A1    Jan. 27, 2011

(30) Foreign Application Priority Data
Mar. 28, 2008 (JP) .................................. 2008-088402

(51) Int. Cl.
*F16L 55/00* (2006.01)
(52) U.S. Cl.
USPC ........... 138/104; 138/121; 138/127; 138/134; 138/149
(58) Field of Classification Search
USPC ........................ 138/104, 121, 127, 134, 149
See application file for complete search history.

(56) References Cited

U.S. PATENT DOCUMENTS

| 4,492,089 | A | * | 1/1985 | Rohner et al. | .................. 62/50.7 |
| 5,308,162 | A | * | 5/1994 | Amano et al. | .................. 374/131 |

(Continued)

FOREIGN PATENT DOCUMENTS

| EP | 0 949 444 A2 | 10/1999 |
| JP | U-50-032651 | 4/1975 |

(Continued)

OTHER PUBLICATIONS

International Search Report issued in International Application No. PCT/JP2009/054453 on Jun. 2, 2009.

(Continued)

*Primary Examiner* — James Hook
(74) *Attorney, Agent, or Firm* — Oliff PLC

(57) ABSTRACT

Provided is a flexible tube which is used to load fluid from a floating facility on the sea onto a tanker, which is suitable for transport of cryogenic fluid such as LNG, and which is capable of quickly and reliably detecting leakage of the fluid in the tube. Also provided is a structure for detecting leakage of fluid in a tube. A water impermeable and heat insulating layer is provided on the outer periphery of a heat insulating layer. The water impermeable and heat insulating layer, together with the heat insulating layer, thermally insulates LNG flowing through a corrugated tube from the outside of a flexible tube. Unlike the heat insulating layer, the water impermeable and heat insulating layer is poor in liquid permeability, and fluid such as LNG hardly permeates the water impermeable and heat insulating layer. That is, the water impermeable and heat insulating layer serves as a water impermeable layer between the inside and outside of the water impermeable and heat insulating layer.

10 Claims, 7 Drawing Sheets

(56) References Cited

U.S. PATENT DOCUMENTS

| | | | |
|---|---|---|---|
| 5,551,484 A * | 9/1996 | Charboneau | 138/104 |
| 6,186,181 B1 | 2/2001 | Schippl | |
| 8,479,565 B2 * | 7/2013 | Izumo et al. | 73/40.5 R |
| 2005/0155663 A1 | 7/2005 | Dhellemmes et al. | |
| 2005/0211324 A1* | 9/2005 | Takagi et al. | 138/121 |
| 2009/0084459 A1* | 4/2009 | Williams | 138/133 |

FOREIGN PATENT DOCUMENTS

| | | |
|---|---|---|
| JP | U-55-145790 | 10/1980 |
| JP | A-56-138585 | 10/1981 |
| JP | U-58-112797 | 8/1983 |
| JP | U-58-144184 | 9/1983 |
| JP | U-02-000482 | 1/1990 |
| JP | A-05-065718 | 3/1993 |
| JP | A-05-180375 | 7/1993 |
| JP | A-08-034678 | 2/1996 |
| JP | A-11-325327 | 11/1999 |
| JP | A-2001-182872 | 7/2001 |
| JP | A-2002-333092 | 11/2002 |
| JP | A-2004-340420 | 12/2004 |
| JP | A-2005-207592 | 8/2005 |

OTHER PUBLICATIONS

May 6, 2013 Office Action issued in Australian Patent Application No. 2009230351.

Nov. 9, 2010 International Preliminary Report on Patentability issued in International Application No. PCT/JP2009/054453.

* cited by examiner

FLEXIBLE TUBE FOR TRANSPORTING CRYOGENIC FLUID AND STRUCTURE FOR DETECTING LEAKAGE OF FLUID IN TUBE

TECHNICAL FIELD

The present invention relates to a flexible tube which is used to transport cryogenic fluid, such as liquefied natural gas, from an oceanic floating facility on the sea to a tanker or the like, and to a structure for detecting leakage of the fluid from such a flexible tube.

BACKGROUND ART

Conventionally, when petroleum oil or the like produced from a subsea oil field or the like is to be loaded onto a transport tanker from a floating facility (a base) on the sea where the petroleum oil or the like is stored, the floating facility and the tanker are connected together by use of a floating flexible tube, and the petroleum oil or the like is transported through the flexible tube. In general, a flexible tube formed of resin is used for transport of petroleum oil or the like of ordinary temperature. As such a resin flexible tube for fluid transport, there is known a flexible fluid transport tube which has a reinforcement layer, a heat insulating layer, a waterproof layer, etc., provided on the outer periphery of an inner tube formed of resin (Patent Document 1).

Meanwhile, natural gas or the like produced from gas fields on land or in adjacent sea is liquefied and stored at a base. When liquefied natural gas (hereinafter referred to as "LNG") is loaded onto a transport tanker, an articulated loading arm or the like provided at a coastal base is used. Examples of a base for receiving LNG include an LNG receiving base system and an LNG shipping base system which are described in Patent Document 2 and in which a loading arm scheme is employed (Patent Document 2).

Patent Document 1: Japanese Patent Application Laid-Open (kokai) No. H5-180375
Patent Document 2: Japanese Patent Application Laid-Open (kokai) No. H5-65718

DISCLOSURE OF THE INVENTION

Problems to be Solved by the Invention

The loading arm scheme as disclosed in Patent Document 2 can be used for loading from a base on land to a tanker. However, if the loading arm scheme is used to load LNG onto a tanker from a floating facility which is disposed at an open sea gas field and which produces and stores LNG, the loading arm fails to follow movement of the tanker in relation to the facility which greatly shakes because of waves, wind, etc. In addition, the loading arm scheme has a problem of causing an increase in the size of the facility.

A scheme which has been conventionally employed for transport of petroleum oil and in which fluid is loaded onto a tanker by making use of a floating flexible tube formed of resin as disclosed in Patent Document 1 encounters difficulty in coping with cryogenic fluid such as LNG, for the following reason. LNG has a very low temperature of about −160° C., and the conventional floating flexible tube formed of resin becomes brittle at such a very low temperature. Therefore, the conventional floating flexible tube fails to have sufficient flexibility, and, through embrittlement, the flexible tube breaks due to pressure under which LNG is fed. Accordingly, flexible tubes which can be used at a very low temperature and which have sufficient durability and heat insulating performance are required. However, conventionally, a floating flexible tube which can be used for transport of cryogenic fluid, such as LNG, on the sea has not been provided.

If cryogenic fluid, such as LNG, leaks from an inner tube, the leaked cryogenic fluid causes embrittlement of the outermost waterproof layer or the like formed of resin, which may result in breakage of the flexible tube and spouting of the fluid to the outside. However, there has not been provided a method for quickly and reliably detecting leakage of fluid from the inner tube.

The present invention has been accomplished in view of such problems, and its object is to provide a flexible tube which is used to load fluid from an oceanic floating facility on the sea onto a tanker, which allows transport of cryogenic fluid such as LNG, and which can include a temperature sensor for leakage detection to thereby realize quick and reliable detection of leakage of the fluid in the tube. Another object of the present invention is to provide a structure for detecting leakage of fluid in a tube.

Means for Solving the Problems

To achieve the above object, a first invention provides a flexible tube for transporting a cryogenic fluid, comprising at least a corrugated metallic inner tube having flexibility; a reinforcement layer provided on the outer periphery of the corrugated metallic inner tube; a first heat insulating layer provided on the outer periphery of the reinforcement layer; a second heat insulating layer provided on the outer periphery of the first heat insulating layer; and a waterproof layer provided on the outer periphery of the second heat insulating layer, wherein the first heat insulating layer is superior to the second heat insulating layer in terms of liquid permeability.

Desirably, an optical fiber temperature sensor is provided, as a temperature sensor, between the first heat insulating layer and the second heat insulating layer, and the optical fiber temperature sensor is continuously wound on the outer periphery of the first heat insulating layer.

Desirably, the second heat insulating layer is a layer of nonwoven fabric containing aerogel. Desirably, and the first heat insulating layer is thinner than the second heat insulating layer. Here, aerogel refers to a substance which is produced in the form of gel through replacement of moisture with gas, which contains air in an amount of about 90% or more by volume, and which is very light and has high heat insulating performance. Aerogel is mainly formed of silica, alumina, or the like, and is used as catalyst or absorbent in many cases.

A liquid permeation prevention layer may be further provided between the first heat insulating layer and the second heat insulating layer. The corrugated metallic inner tube may be a stainless steel tube, and a seat layer for absorbing unevenness of an outer circumferential surface of the corrugated metallic inner tube may be provided between the corrugated metallic inner tube and the first heat insulating layer.

Furthermore, the reinforcement layer is formed by use of a tape selected from polyester fiber fabric tape, aramid fiber fabric tape, arylate fiber fabric tape, ultrahigh molecular weight polyethylene fiber fabric tape, carbon fiber fabric tape, and metallic tape, and the tape is wound around the inner tube in clockwise and counterclockwise directions alternately so as to form superimposed layers of the tape. The flexible tube may be a flexible tube for transporting a cryogenic fluid. Since a cryogenic fluid (e.g., LNG) having a temperature of about −160° C. or lower is passed through the metallic inner tube, the above-mentioned resin fiber tapes, which are low in heat conductivity, are preferred, because the resin fiber tapes provide a higher heat insulating effect as compared with the carbon fiber fabric tape and the metallic tape. Moreover, the fiber fabric tape is preferred, because the fiber fabric tape can be wound around the corrugated metallic tube more flexibly as compared with the metallic tape.

According to the first invention, a reinforcement layer is provided on the outer periphery of a corrugated metallic inner tube. Since the wall thickness of the corrugated metallic inner tube is restricted to a predetermined thickness so as to maintain flexibility, the inner tube may deform in the axial direction because of the pressure of fluid within the inner tube. Therefore, the reinforcement layer is provided in order to suppress deformation of the inner tube in the axial direction. Furthermore, the reinforcement layer also has an effect of suppressing deformation in the radial direction, and an effect of improving creep resistance.

Moreover, since the fluid within the inner tube is thermally insulated from the outside of the flexible tube by means of the first and second heat insulating layers, the fluid is not affected by the outside temperature, and the waterproof layer, which is an outer layer of the flexible tube, is not affected by the fluid.

Since the first heat insulating layer is excellent in liquid permeability and the second heat insulating layer is poor in liquid permeability, when the fluid leaks from the inner tube, the fluid permeates preferentially the first heat insulating layer and is less likely to permeate the outer second heat insulating layer. Therefore, the fluid does not reach the outer layer of the flexible tube, and the heat insulating effect can be maintained. That is, the first heat insulating layer has not only a heat insulating effect but also an effect of causing the fluid to permeate and spread over a large area without staying a single location; and the second heat insulating layer has not only a heat insulating effect but also an effect of serving as a water impermeable layer for preventing permeation of the fluid, to thereby has an effect of maintaining the heat insulating effect and delaying embrittlement or breakage of the flexible tube.

In particular, when the first heat insulating layer is thinner than the second heat insulating layer, the effect of dispersing the fluid into the first heat insulating layer due to liquid permeation is high, and the water stopping effect of the second heat insulating layer is high. Furthermore, in the case where the liquid permeation prevention layer is provided between the first heat insulating layer and the second heat insulating layer, a higher water stopping performance can be attained, and the liquid permeation prevention layer effectively functions as a water impermeable layer.

In the case where nonwoven fabric containing aerogel is used to form the second heat insulating layer, a higher heat insulating effect can be attained, an effect of preventing permeation of the fluid is high, and a very high strength can be attained.

In the case where a temperature sensor is provided between the first heat insulating layer and the second heat insulating layer, it becomes possible to detect the temperature of the fluid permeating the first heat insulating layer. In particular, in the case where an optical fiber temperature sensor is continuously wound at a predetermined pitch, when the fluid permeates the first heat insulating layer and reaches the optical fiber temperature sensor, the optical fiber temperature sensor can detect the presence/absence of a portion from which the fluid has leaked, and the leakage location. The winding of the optical fiber temperature sensor is not necessarily required to be performed at a predetermined pitch, so long as the optical fiber temperature sensor is wound continuously and the winding length and winding portion thereof are known.

In the case where the inner tube is a corrugated metallic tube, through provision of a seat layer on the outer periphery of the inner tube, the unevenness of the outer circumference of the inner tube can be absorbed, whereby a flat surface can be provided. Thus, installation of the reinforcement layer, etc., which are provided on the outer periphery of the inner tube, becomes easier, and shifting of the wound tape or the like and rubbing between the reinforcement layer and the uneven outer periphery of the inner tube can be suppressed.

The second invention is a structure for detecting leakage of a fluid in a tube, characterized by comprising an inner tube through which the fluid flows; a first heat insulating layer provided on the outer periphery of the inner tube; a second heat insulating layer provided on the outer periphery of the first heat insulating layer; and an optical fiber temperature sensor wound at a predetermined pitch between the first heat insulating layer and the second heat insulating layer, wherein the first heat insulating layer is superior to the second heat insulating layer in terms of liquid permeability, and, when the fluid leaks from the inner tube, the fluid permeates the first heat insulating layer preferentially over the second heat insulating layer, and a temperature change is detected by the optical fiber temperature sensor, whereby the leakage of the fluid is detected.

According to the second invention, the first heat insulating layer is superior to the second heat insulating layer in terms of liquid permeability. Therefore, the fluid leaked from the inner tube preferentially permeates the first heat insulating layer without permeating the second heat insulating layer, and spreads into the first heat insulating layer. Therefore, by making use of the optical fiber temperature sensor provided on the outer periphery of the first heat insulating layer, the presence/absence of a portion from which the fluid has leaked and the position of the leakage can be detected.

Effect of the Invention

According to the present invention, there can be provided a flexible tube which is used to load fluid from a floating facility on the sea onto a tanker, which is suitable for transport of cryogenic fluid such as LNG, and which is capable of quickly and reliably detecting leakage of the fluid in the tube. Also, a structure for detecting leakage of the fluid in the tube can be provided.

BRIEF DESCRIPTION OF THE DRAWINGS

FIGS. 5(a) to 5(c) are views showing detection of leakage of fluid 21 by the optical fiber temperature sensor, wherein FIG. 5(a) shows a state immediately after generation of a leakage portion 23, FIG. 5(b) shows a state in which the fluid 21 has flowed into a waterproof layer 9, and FIG. 5(c) shows a state in which the fluid 21 has permeated the waterproof layer 9 and reached the vicinity of the optical fiber temperature sensor 15.

Figure 1:
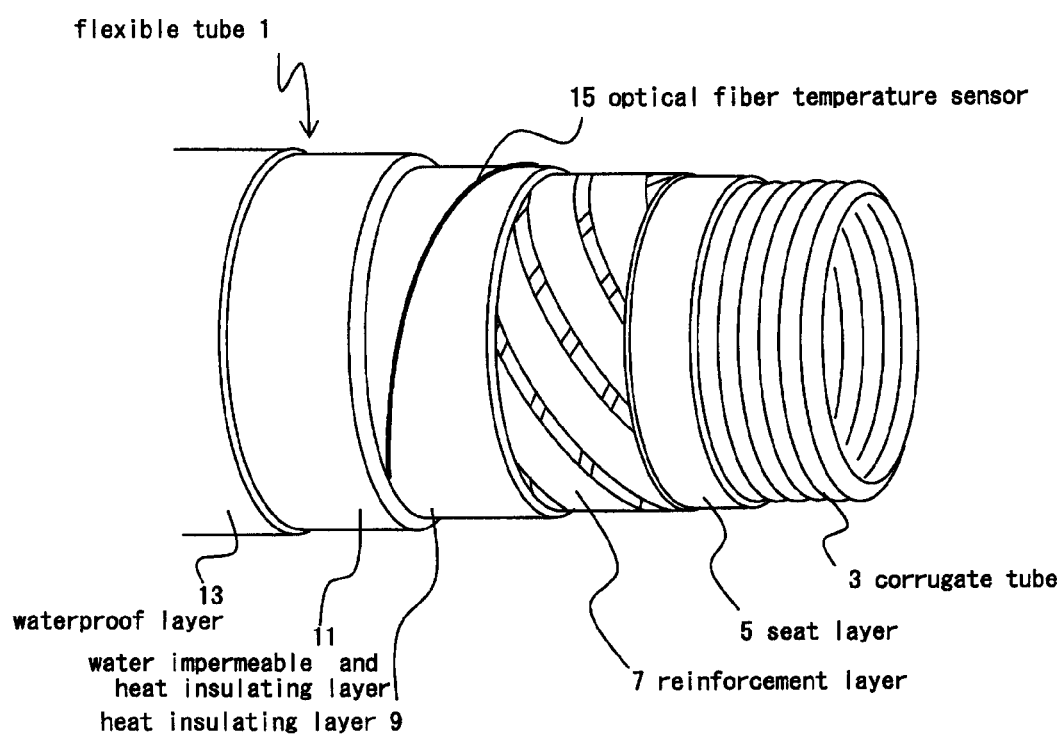
FIG. 1 is a perspective view showing the structure of a flexible tube 1.

DESCRIPTION OF REFERENCE NUMERALS 1, 40: flexible tube
3: corrugated tube
5: seat layer
7: reinforcement layer
9: heat insulating layer
11: water impermeable and heat insulating layer
13: waterproof layer
15: optical fiber temperature sensor
16: temperature dropped portion
17: metallic tube
19: optical fiber
21: fluid
23: leakage portion
30: oceanic floating facility
31: supply section
35: receiving section
37: tanker
39: drum
41: liquid permeation prevention layer

BEST MODE FOR CARRYING OUT THE INVENTION

Figure 2:
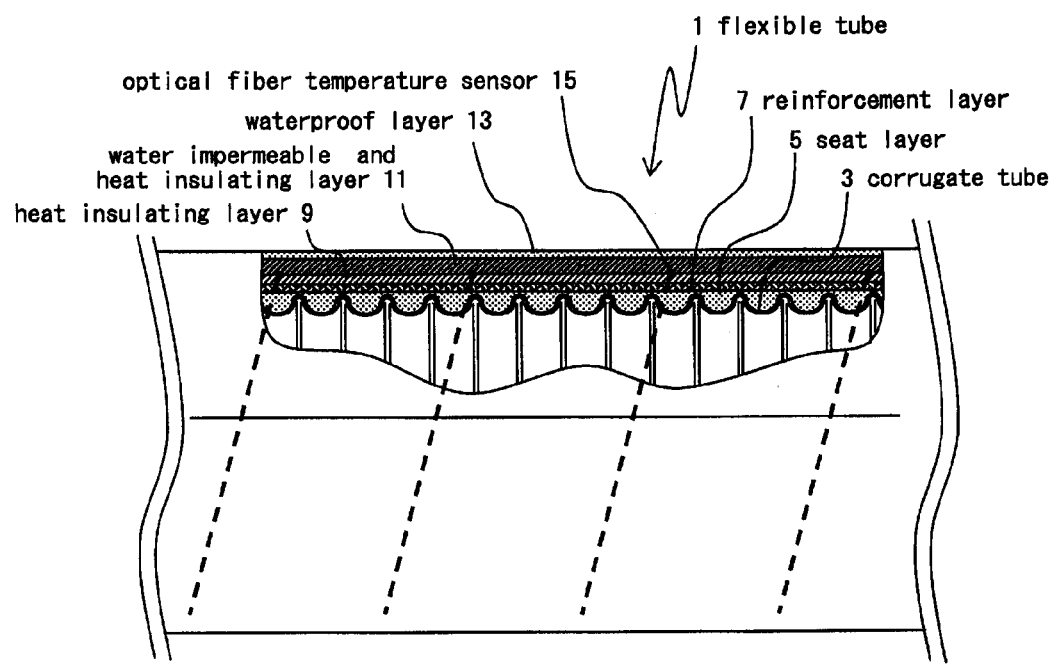
FIG. 2 is a partial sectional view showing the structure of the flexible tube 1.

A flexible tube 1 according to an embodiment of the present invention will now be described. FIG. 1 is a perspective view showing the structure of the flexible tube 1; and FIG. 2 is a partial sectional view of the flexible tube 1. The flexible tube 1 is mainly composed of a corrugated tube 3, a seat layer 5, a reinforcement layer 7, a heat insulating layer 9, a water impermeable and heat insulating layer 11, a waterproof layer 13, and an optical fiber temperature sensor 15.

In general, in consideration of transport efficiency of fluid, a tanker of 100,000 tons to 150,000 tons is used for transport of fluid on the sea. Furthermore, since weather changes greatly on the sea, in general, an operation of loading fluid onto a tanker or the like is desired to be completed within 24 hours. Accordingly, in the case where the flow rate of fluid is 5 m/sec, several flexible tubes 1, each having a diameter of about 400 mm to 500 mm, are used simultaneously in consideration of loading efficiency. Desirably, the flexible tube 1 has a large diameter so as to increase fuel transport efficiency. However, in such a case, the allowable bending radius of the flexible tube 1 increases, and an apparatus for laying the flexible tube 1 increases in size. Therefore, the diameter of the flexible tube 1 is properly determined in accordance with conditions of use, etc.

The innermost layer of the flexible tube 1 is the corrugated tube 3, which is provided as an inner tube. When the flexible tube 1 is used, fluid (in the following description, the fluid is assumed to be LNG) is caused to flow through the corrugated tube 3. The corrugated tube 3, is a tubular member having flexibility, has some strength and is excellent in low-temperature resistance. That is, preferably, the corrugated tube 3 is formed of a material which can maintain flexibility and is unlikely to generate a fissure or crack even when cryogenic fluid, such as LNG, flows through the corrugated tube 3. For example, the corrugated tube 3 is a corrugated tube formed of metal, desirably, a bellow tube formed of stainless steel. Notably, in place of the corrugated tube 3, an inner tube of other type may be used, so long as the inner tube to be used has flexibility of a similar degree and is excellent in low-temperature resistance.

The seat layer 5 is provided on the outer periphery of the corrugated tube 3. The seat layer 5 absorbs unevenness (projections and depressions attributable to the corrugated shape) on the outer circumference of the corrugated tube 3 to thereby provide a generally flat circumferential surface. The seat layer 5 can deform in order to follow flexing of the corrugated tube 3. That is, the seat layer 5 has some thickness, and serves as a cushion for absorbing unevenness on the outer circumference of the corrugated tube 3 attributable to the corrugated shape thereof. However, the seat layer 5 does not need to completely fill the depressions. The reinforcement layer 7, etc., which will be described later, are provided on the outer periphery of the corrugated tube 3. The unevenness on the outer circumference of the corrugated tube 3 makes difficult winding of reinforcement tape or the like which constitutes the reinforcement layer 7. Further, the reinforcement tape or the like may shift during use or in other situations. The seat layer 5 is provided so as to overcome such drawbacks.

Notably, for example, nonwoven fabric or the like can be used to form the seat layer 5. Furthermore, the seat layer 5 is unnecessary in the case where the inner tube does not have a large unevenness on the outer circumferential surface thereof attributable to, for example, its corrugated shape, or the case where the unevenness does not adversely affect the reinforcement layer 7, etc. provided on the outer periphery of the inner tube.

The reinforcement layer 7 is provided on the outer periphery of the seat layer 5. The reinforcement layer 7 suppresses mainly deformation (extension) of the corrugated tube 3 in the axial direction of the flexible tube 1, and can deform so as to follow flexing of the corrugated tube 3. For example, when LNG is caused to flow into the corrugated tube 3, an internal pressure of about 1 MPa is produced within the corrugated tube 3. The corrugated tube 3 can withstand a pressure acting on the inner circumferential surface of the corrugated tube 3. However, upon generation of an internal pressure, the corrugated tube 3 easily deforms (extends) in the axial direction of the corrugated tube 3 because of the corrugated shape provided so as to attain flexibility. Therefore, the reinforcement layer 7 is provided so as to suppress deformation of the corrugated tube 3 in the axial direction.

The reinforcement layer 7 is formed by means of winding reinforcement tape such as fiber tape, metallic tape, or the like. Examples of the fiber tape includes polyester fiber fabric tape, aramid fiber fabric tape, arylate fiber fabric tape, ultrahigh molecular weight polyethylene fiber fabric tape, and carbon fiber fabric tape. An example of the metallic tape is stainless steel tape.

In order to form the reinforcement layer 7, the reinforcement tape is wound around the seat layer 5 at a predetermined pitch. The reinforcement tape is not required to be wound such that end portions (with respect to the width direction) of axially adjacent portions of the reinforcement tape overlap each other. That is, the winding pitch of the reinforcement tape can be made greater than the width of the reinforcement tape. The reinforcement tape is wound on the seat layer 5 such that the reinforcement tape forms at least two superimposed layers, and the winding direction of the reinforcement tape in the first layer is opposite that of the reinforcement tape in the second layer. That is, the reinforcement tape is wound on the outer periphery of the seat layer 5 such that the reinforcement tape in the first layer and that in the second layer cross each other (such winding will be referred to as "alternate winding").

The alternate winding is employed for the following reason. In the case where the reinforcement tape is wound in a single direction, when the flexible tube 1 receives a force in the axial direction, a twisting force is generated in the flexible tube 1 in a direction corresponding to the winding direction of the reinforcement tape. When necessary, an unillustrated holding winding layer for holding the reinforcement tape may be provided on the outer periphery of the wound reinforcement tape. The holding winding layer may be formed by use of, for example, nonwoven fabric tape, and may be wound around the outer surface of the reinforcement layer formed through alternate winding of the reinforcement tape, or the outer surface of each winding layer.

The heat insulating layer 9 is provided on the outer periphery of the reinforcement layer 7. The heat insulating layer 9 can provide thermal insulation between LNG flowing through the corrugated tube 3 and the outside of the flexible tube 1, and can deform so as to follow flexing of the corrugated tube 3. That is, heat of LNG is hardly transmitted to the outer surface of the flexible tube 1. Therefore, the waterproof layer 13, which is the outermost layer to be described later, does not receive the influence of the temperature of the LNG. Similarly, the outside temperature of the flexible tube 1 is not transmitted to the LNG, whereby evaporation of the LNG within the flexible tube 1 is prevented.

Desirably, the heat insulating layer 9 is formed of a material which has heat insulating properties and is excellent in liquid permeability. For example, nonwoven fabric, desirably, polyester fiber nonwoven fabric, is used to form the heat insulating layer 9. Desirably, the heat insulating layer 9 has a thickness of 5 mm or greater.

The water impermeable and heat insulating layer 11 is provided on the outer periphery of the heat insulating layer 9. The water impermeable and heat insulating layer 11, together with the heat insulating layer 9, can provide thermal insulation between the LNG flowing through the corrugated tube 3 and the outer periphery of the flexible tube 1, and can deform so as to follow flexing of the corrugated tube 3. Unlike the heat insulating layer 9, the water impermeable and heat insulating layer 11 is poor in liquid permeability. Therefore, fluid such as LNG hardly permeates the water impermeable and heat insulating layer 11. That is, the water impermeable and heat insulating layer 11 serves as a water impermeable layer between the inside and outside of the water impermeable and heat insulating layer 11.

The water impermeable and heat insulating layer 11 must be formed of a material which is high in heat insulating performance and low in liquid permeability. An example of such a material is fiber-based nonwoven fabric containing aerogel. For example, silica aerogel may be used as the aerogel, and the aerogel is included in the nonwoven fabric (through impregnation). The aerogel has an extremely high heat insulating performance and has a high load resistance. Further, the nonwoven fabric containing the aerogel is very poor in liquid permeability. Even when LNG reaches the water impermeable and heat insulating layer 11, the LNG hardly permeates the water impermeable and heat insulating layer 11. Furthermore, since the nonwoven fabric containing the aerogel is unlikely to collapse, the waterproof layer 13 to be described later does not loosen.

The thickness of the water impermeable and heat insulating layer 11 is desirably greater than that of the heat insulating layer 9, and the heat insulating layer 9, which serves as a liquid permeating layer, preferably has a small thickness, for the following reason. When the water impermeable and heat insulating layer 11 is thick, high thermal insulating performance can be attained. In addition, as described later, when LNG leaks, the LNG can permeate the heat insulating layer 9 over a wide area within a short period of time. Notably, the water impermeable and heat insulating layer 11 may be formed by means of superimposing a plurality of layers.

The waterproof layer 13 is provided on the outer periphery of the water impermeable and heat insulating layer 11. The waterproof layer 13 can prevent entry of water from the outside, and can deform so as to follow flexing of the corrugated tube 3. That is, seawater or the like does not infiltrate into the interior of the flexible tube 1, even when the flexible tube 1 is laid on the water and LNG is transported through the flexible tube 1. Notably, the waterproof layer 13 is formed of, for example, resin, preferably, polyethylene. As described above, since the heat insulating layer 9 and the water impermeable and heat insulating layer 11 are present, the influence of the temperature of LNG (cryogenic fluid) hardly reach the waterproof layer 13. Therefore, there is no possibility that the waterproof layer 13 becomes brittle due to low temperature and fails to follow flexing of the corrugated tube 3.

The flexible tube 1 further includes the optical fiber temperature sensor 15. The optical fiber temperature sensor 15 is provided between the heat insulating layer 9 and the water impermeable and heat insulating layer 11, and is spirally and continuously wound around the waterproof layer 9. The optical fiber temperature sensor 15 is desirably wound on the outer periphery of the waterproof layer 9 at a constant pitch of, for example, about 200 mm, preferably, about 100 mm. Furthermore, a light source, an optical splitter, an amplifier, a measurement device, etc., which are not shown, are connected to end portions of the optical fiber temperature sensor 15.

Figure 3:
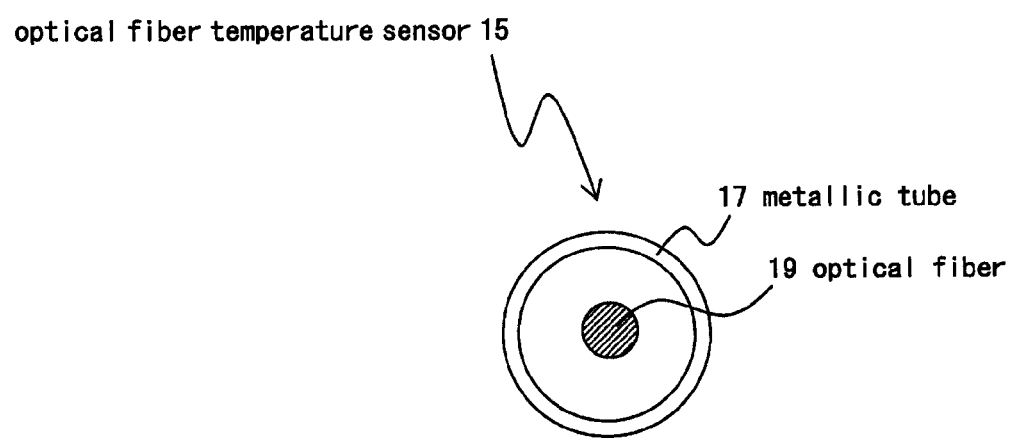
FIG. 3 is a sectional view showing an optical fiber temperature sensor 15.

FIG. 3 is a sectional view showing the structure of the optical fiber temperature sensor 15. The optical fiber temperature sensor 15 is composed of a metallic tube 17, an optical fiber 19, etc. The optical fiber 19 is inserted into the metallic tube 17. For example, a stainless steel pipe having a diameter of about 1 to 2 mm can be used as the metallic tube 17. Notably, desirably, the optical fiber 19 has an extra length ratio (the ratio of an extra length of the optical fiber 19 in relation to the length of the metallic tube 17) of 1% or more so that, when the flexible tube 1 deforms, the optical fiber 19 can follow the deformation of the flexible tube 1.

The optical fiber temperature sensor 15 measures a temperature distribution by making use of the phenomenon that the intensity of Raman scattering light depends on temperature and the concept that the location where Raman scattering light is generated can be determined from a time required for an optical pulse to propagate back and forth through the optical fiber 19. When optical pulses are fed to the optical fiber 19 at a constant period, Raman scattering light is generated as backward scattering light. The ratio in intensity between anti-Stokes light and Stokes light of Raman scattering light depends on the temperature of the optical fiber 19. That is, the intensity of scattering light (the intensity ratio between anti-Stokes light Ia and Stokes light Is) increases and decreases with temperature. Accordingly, the temperature at each measurement position can be known by means of observing the intensity ratio between anti-Stokes light and Stokes light for the fed optical pulse on the time axis. That is, the optical fiber temperature sensor 15 can measure the temperature distribution of the flexible tube 1.

Figure 4:
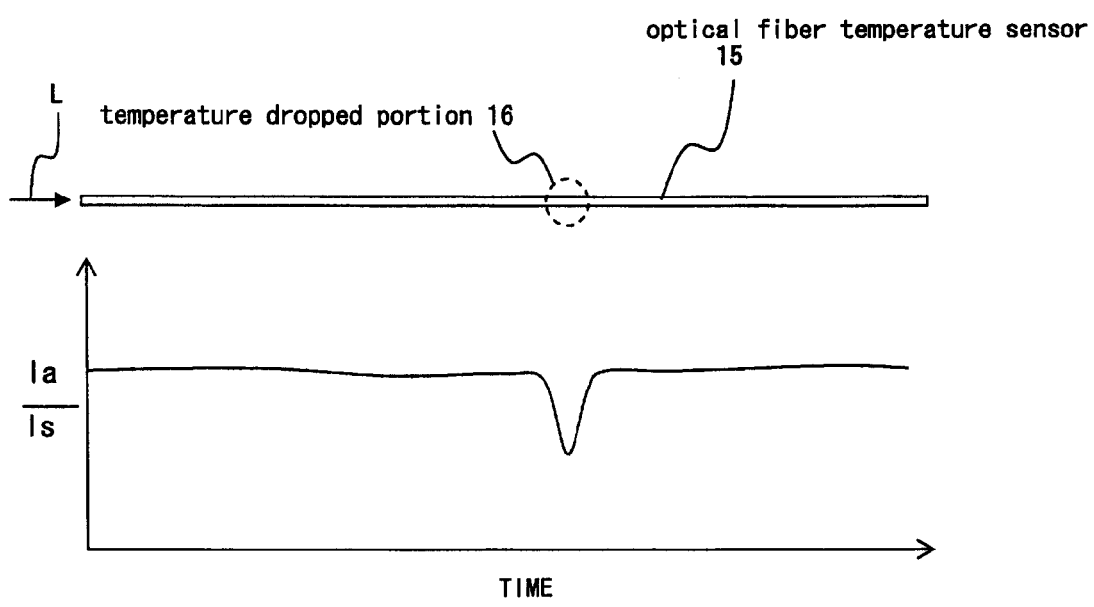
FIG. 4 is a schematic view showing a state in which the optical fiber temperature sensor 15 has detected a temperature dropped portion 16.

FIG. 4 is a schematic diagram showing a change in a measurement value (the intensity ratio between anti-Stokes light Ia and Stokes light Is) of Raman scattering light in the case where the optical fiber temperature sensor 15 has a temperature dropped portion 16. Since the optical fiber temperature sensor 15 is located on the outer side of the heat insulating layer 9, in an ordinary state, the influence, on the optical fiber temperature sensor 15, of the temperature of LNG flowing through the corrugated tube 3 is small. Therefore, the optical fiber temperature sensor 15 shows that the temperature is constant (substantially ordinary temperature) over the entire length of the flexible tube 1 (the entire length of the optical fiber temperature sensor 15). In such case, the intensity ratio between anti-Stokes light Ia and Stokes Is light measured for the optical pulse L becomes approximately constant over the entire length of the optical fiber temperature sensor 15.

Meanwhile, when the corrugated tube 3 breaks and LNG or the like flows out from a portion of the corrugated tube 3, the LNG permeates the heat insulating layer 9, and the temperature of the optical fiber temperature sensor 15 sharply drops at a position corresponding to that portion. That is, the temperature dropped portion 16 is produced in the optical fiber temperature sensor 15.

When the temperature sharply dropped portion 16 is produced in the optical fiber temperature sensor 15, the intensity of Raman scattering light (the intensity ratio between anti-Stokes light Ia and Stokes light Is) decreases at the temperature dropped portion 16. Accordingly, the optical fiber temperature sensor 15 can detect an approximate position of the temperature dropped portion 16 and a temperature drop at that position. Accordingly, in the case where LNG is locally leaked from the corrugated tube 3 within the flexible tube 1, a portion of the optical fiber temperature sensor 15 located near the position of the leakage can immediately detect a sharp temperature drop, to thereby detect the leakage of LNG within the flexible tube 1.

Figure 5:
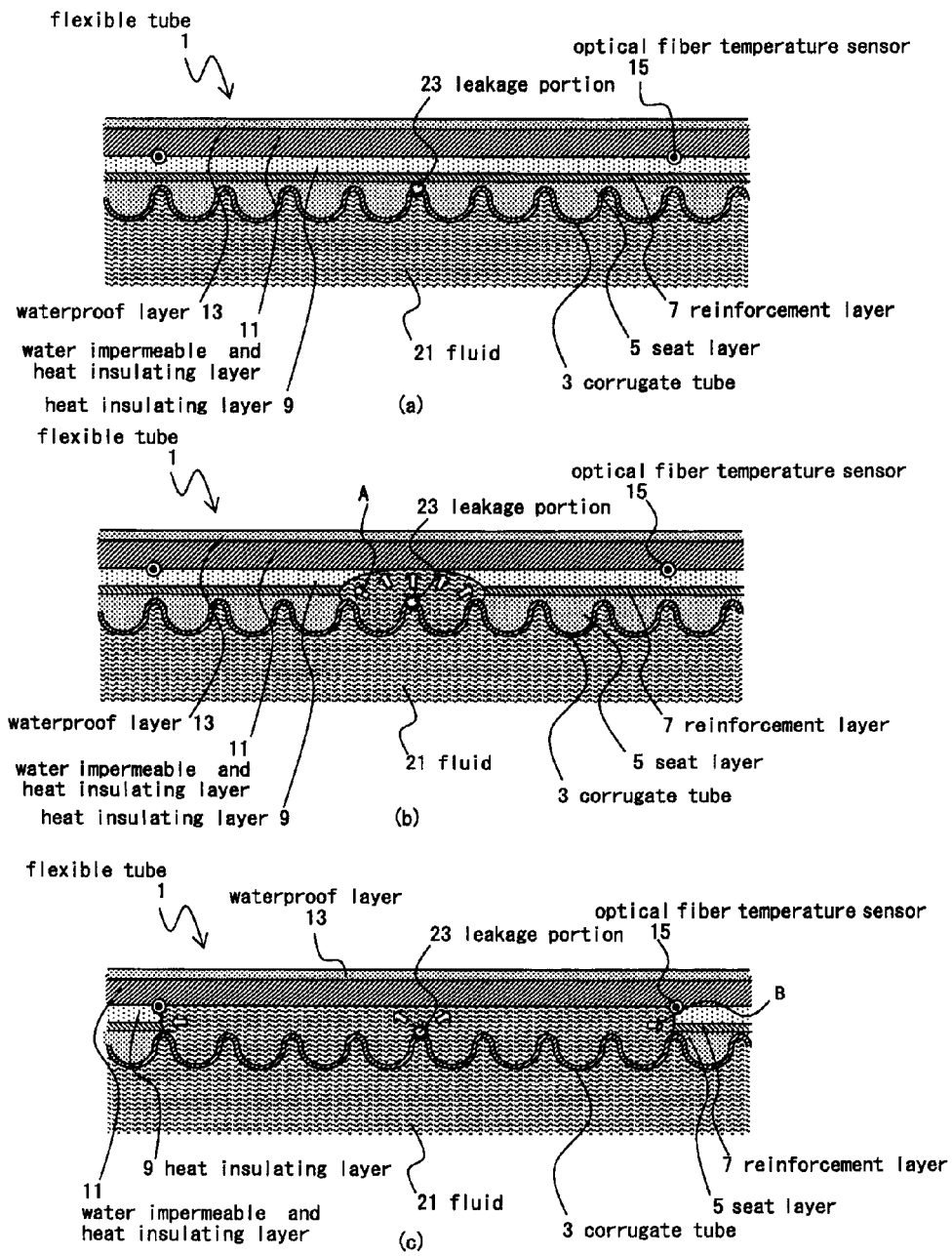

Next, there will be described a state in which LNG leaks and flows out from the corrugated tube 3, and a state in which the leakage of LNG is detected by the optical fiber temperature sensor 15. FIGS. 5(*a*) to 5(*c*) are views showing a state in which the optical fiber temperature sensor 15 detects leakage of LNG from a portion of the corrugated tube 3.

Liquid 21 such as LNG flows within the corrugated tube 3. As shown in FIG. 5(*a*), when a portion of the corrugated tube 3 breaks with formation of a leakage portion 23, the fluid 21 flows to the outside of the corrugated tube 3 from the leakage portion 23.

FIG. 5(*b*) shows a state in which the fluid 21 has flowed out from the leakage portion 23. Since the fluid 21 easily permeates the seat layer 5, the reinforcement layer 7, and the heat insulating layer 9, the fluid permeates and spreads over respective portions of the seat layer 5, the reinforcement layer 7, and the heat insulating layer 9, the portions being located near the leakage portion 23 (arrows A). At that time, if the optical fiber temperature sensor 15 is located near the leakage portion 23, the optical fiber temperature sensor 15 immediately detects the temperature of the fluid 21. Therefore, in the case where the fluid is LNG, the optical fiber temperature sensor 15 can detect the presence of a very low temperature portion in the vicinity of the leakage portion 23. Accordingly, the presence of the leakage portion 23 can be detected.

Meanwhile, since the optical fiber temperature sensor 15 is wound on the heat insulating layer 9 at a predetermined pitch, as shown in FIG. 5(*b*), the distance from the leakage portion 23 to the optical fiber temperature sensor 15 may be long in some cases. In such a state, it is difficult for the optical fiber temperature sensor 15 to detect leakage of the fluid 21.

FIG. 5(*c*) shows a state after the outflow of the fluid 21 from the leakage portion 23 has continued. As shown in FIG. 5(*c*), the fluid 21 flowed out of the leakage portion 23 expands the area permeated with the fluid 21, while permeating the heat insulating layer 9 (and the reinforcement layer 7, the seat layer 5, etc.). At that time, since the water impermeable and heat insulating layer 11 is poor in liquid permeability, the fluid 21 hardly permeates the water impermeable and heat insulating layer 11. That is, the fluid 21 expands in the circumferential direction or the longitudinal direction of the flexible tube 1 inside the water impermeable and heat insulating layer 11 (directions of arrows B).

When the fluid 21 has expanded in a layer form inside the water impermeable and heat insulating layer 11 and reached the vicinity of the optical fiber temperature sensor 15, the temperature of a corresponding portion of the optical fiber temperature sensor 15 sharply drops. Accordingly, leakage of the fluid 21 can be detected.

Notably, in the case where the flexible tube 1 is not required to have a fluid leakage detection function, the optical fiber temperature sensor 15 is unnecessary. Even in such a case, the flexible tube 1 can be used as a floating flexible tube for transport of cryogenic fluid, such as LNG, on the sea.

Figure 6:
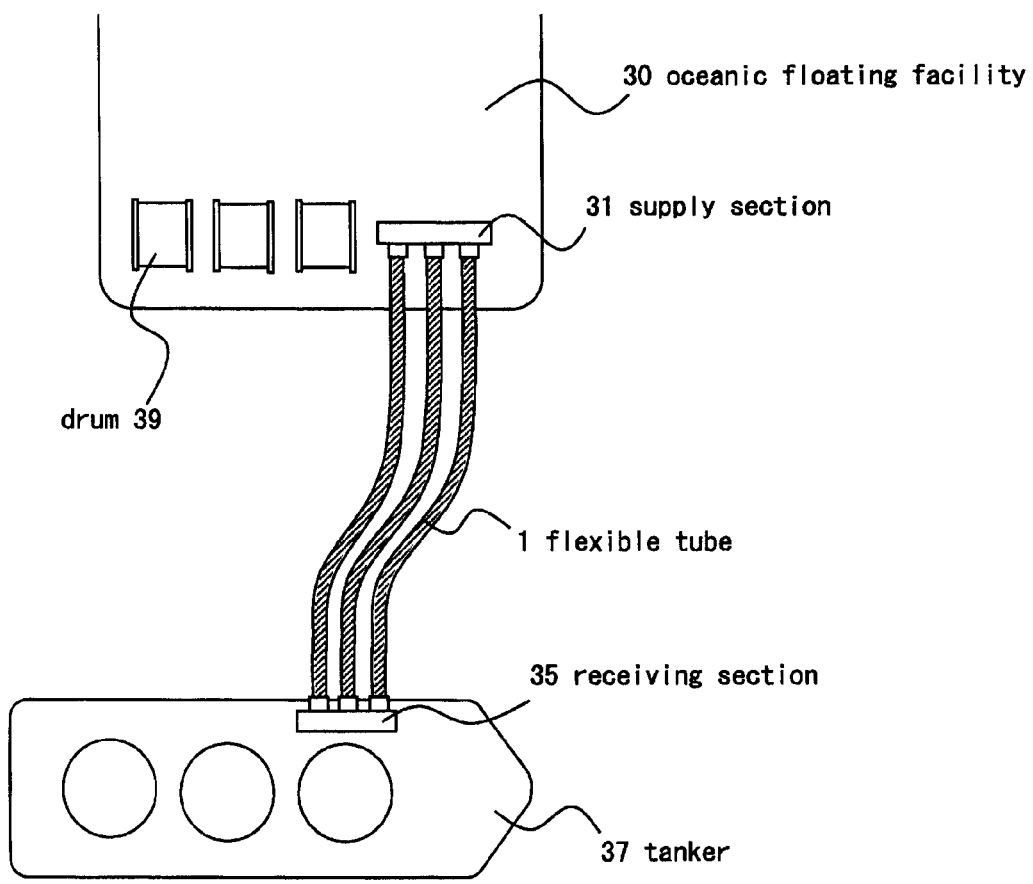
FIG. 6 is a view showing a situation where the flexible tube 1 is used.

FIG. 6 shows a state in which the flexible tube 1 is used. An oceanic floating facility 30 is provided on the sea. The oceanic floating facility 30 is a storage base which is provided especially on the open sea and which liquefies and stores natural gas produced from a subsea gas field. The LNG stored at the oceanic floating facility 30 is regularly transported to a tanker 37.

A supply section 31 is provided on the oceanic floating facility 30. The supply section 31 is a section for feeding the LNG stored at the oceanic floating facility 30. Meanwhile, a receiving section 35 is provided on the tanker 37. The receiving section 35 is a section for receiving the LNG fed from the supply section 31.

The flexible tube 1 is wound around a drum 39 or the like for storage. When the flexible tube 1 is used, the flexible tube 1 is fed from the drum 39 onto the sea. On the sea, an unillustrated small ship or the like guides an end portion of the flexible tube 1 to the tanker 37. After the flexible tube 1 has been fed onto the sea sufficiently, opposite ends of the flexible tube 1 are connected to the supply section 31 and the receiving section 35, respectively. While floating on the sea, the flexible tube 1 transports to the receiving section 35 the LNG fed from the supply section 31. Thus, loading of LNG from the oceanic floating facility 30 onto the tanker 37 is performed. At that time, since the flexible tube 1 has flexibility, the flexible tube 1 can follow a change in relative position between the oceanic floating facility 30 and the tanker 37, which change is caused by waves or the like. Furthermore, the flexible tube 1 does not require a large space on the oceanic floating facility 30 for storage.

As described above, according to the flexible tube 1 of the present embodiment, the reinforcement layer 7 is provided on the outer periphery of the corrugated tube 3 via the seat layer 5. Therefore, it is possible to prevent the corrugated tube 3 from deforming in the axial direction of the flexible tube 1, which deformation would otherwise be caused by the pressure of the fluid 21 flowing through the corrugated tube 3. Furthermore, the fluid 21 within the corrugated tube 3 is thermally insulated from the outside of the flexible tube 1 by the heat insulating layer 9 and the water impermeable and heat insulating layer 11. Therefore, the fluid 21 is not affected by the outside temperature, and the waterproof layer 13 is not affected by the temperature of the fluid 21.

The heat insulating layer 9 is excellent in liquid permeability, and the water impermeable and heat insulating layer 11 is poor in liquid permeability. Therefore, when the fluid 21 leaks from the corrugated tube 3, the fluid 21 preferentially permeates the heat insulating layer 9 (and the seat layer 5 and the reinforcement layer 7), and the fluid 21 is unlikely to permeate the water impermeable and heat insulating layer 11. Accordingly, the fluid 21 does not flow to the outside of the water impermeable and heat insulating layer 11, and the heat insulating effect can be maintained.

Since the optical fiber temperature sensor 15 is provided between the heat insulating layer 9 and the water impermeable and heat insulating layer 11, the leakage of the fluid 21 within the flexible tube 1 can be detected. Specifically, in an ordinary state, the fluid 21 is thermally insulated by the heat insulating layer 9, and the optical fiber temperature sensor 15 is not affected by the temperature of the fluid 21. However, when the fluid 21 leaks, the fluid 21 permeates the heat insulating layer 9. In such a case, the optical fiber temperature sensor 15 can detect the temperature of the fluid 21 permeating the heat insulating layer 9. Therefore, leakage of the fluid 21 within the flexible tube 1 can be detected.

Since the heat insulating layer 9 is thinner than the water impermeable and heat insulating layer 11, at the time of leakage of the fluid 21, the fluid 21 permeates the heat insulating layer 9 over a large area extending in the circumferential direction and the axial direction of the flexible tube 1, within a short period of time. Therefore, even in the case where the winding pitch of the optical fiber temperature sensor 15 is large and the leakage portion 23 is located away from a position where the optical fiber temperature sensor 15 is wound, the fluid 21 permeates to the vicinity of the optical fiber temperature sensor 15 within a short period of time. Accordingly, when the fluid 21 leaks within the flexible tube 1, the leakage of the fluid 21 can be detected immediately, with the heat insulating effect maintained.

Since the water impermeable and heat insulating layer 11 is formed through impregnation of aerogel into nonwoven fabric, a high heat insulating effect and a high water stopping effect can be attained. Furthermore, since the water impermeable and heat insulating layer 11 is thicker than the heat insulating layer 9, a sufficient heat insulating effect can be attained even when the fluid 21 leaks. Furthermore, the fluid 21 can be prevented from flowing out to the outside of the water impermeable and heat insulating layer 11.

While the embodiment of the present invention has been described with reference to the appended drawings, the technical scope of the present invention is not limited to the embodiment. It is apparent that those skilled in the art can easily conceive various variations or modifications without departing from technical ideas described in claims, and these variations or modifications are to be construed as falling within the technical scope of the present invention.

For example, in the above-described embodiment, the optical fiber temperature sensor 15 is provided between the heat insulating layer 9 and the water impermeable and heat insulating layer 11. However, the sensor for leakage detection is not limited thereto. Ordinary temperature sensors may be attached at predetermined intervals.

Figure 7:
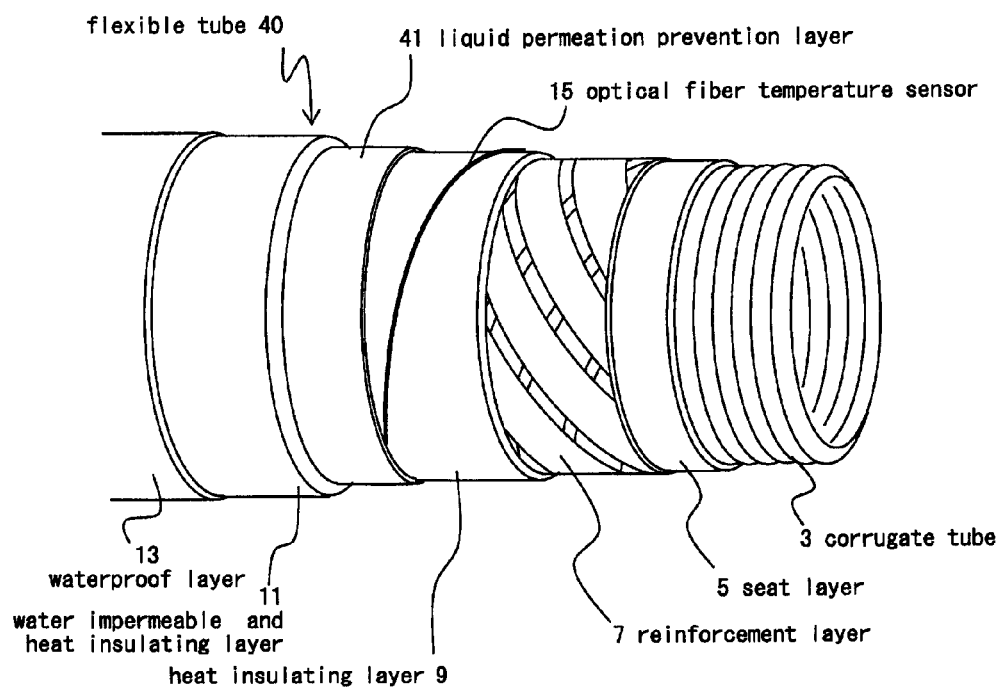
FIG. 7 is a view showing a flexible tube 40 in which a liquid permeation prevention layer 41 is provided.

Furthermore, a liquid permeation prevention layer may be provided between the heat insulating layer 9 and the water impermeable and heat insulating layer 11. FIG. 7 is a view showing a flexible tube 40, in which a liquid permeation prevention layer 41 is provided. Although the water impermeable and heat insulating layer 11 is water impermeable, permeation of the fluid 21 into the water impermeable and heat insulating layer 11 proceeds slowly with elapse of time. Therefore, the liquid permeation prevention layer 41 is provided in order to more reliably prevent permeation of the leaked fluid into an outer layer. In this case, the liquid permeation prevention layer 41 must be unlikely to become brittle at low temperature and must have water stopping performance. Nonwoven tape, metallic tape, or the like may be used to form the liquid permeation prevention layer 41.

Application of the flexible tube 1 is not limited to transport of LNG. The flexible tube 1 can be used for transport of fluid of other types. Especially, for fluids other than those of ordinary temperature, the optical fiber temperature sensor 15 can provide a leakage detection function.

The invention claimed is:

1. A flexible tube for transporting a cryogenic fluid, comprising:
   a flexible corrugated metallic inner tube;
   a reinforcement layer disposed on the outer periphery of the corrugated metallic inner tube, formed by alternate winding of a reinforcement tape, and configured to reduce deformation of the corrugated metallic inner tube in an axial direction;
   a first heat insulating layer disposed on the outer periphery of the reinforcement layer;
   a second heat insulating layer disposed on the outer periphery of the first heat insulating layer;
   an optical fiber temperature sensor disposed between the first heat insulating layer and the second heat insulating layer, and being wound spirally at a predetermined pitch; and
   a waterproof layer disposed on the outer periphery of the second heat insulating layer, wherein
   the second heat insulating layer is configured to be impermeable to water and disposed on the outer periphery of the optical fiber temperature sensor,
   the first heat insulating layer is configured to have a greater liquid permeability than the second insulating layer such that the cryogenic fluid preferentially permeates the first heat insulating layer instead of the second heat insulating layer,
   when there is no presence of a cryogenic fluid leak in the flexible tube, the cryogenic fluid is thermally insulated by the first heat insulating layer and the optical fiber temperature sensor is not affected by the temperature of the cryogenic fluid, and
   in response to a cryogenic fluid leak, the cryogenic fluid permeates the first heat insulating layer which is detected by the optical fiber temperature sensor.

2. The flexible tube for transporting a cryogenic fluid according to claim 1, wherein
   the corrugated metallic inner tube is a stainless steel tube; and
   a seat layer configured to absorb unevenness of an outer circumferential surface of the corrugated metallic inner tube is disposed between the corrugated metallic inner tube and the first heat insulating layer.

3. The flexible tube for transporting a cryogenic fluid according to claim 1, wherein the reinforcement layer is formed of a tape selected from polyester fiber fabric tape, aramid fiber fabric tape, arylate fiber fabric tape, ultrahigh molecular weight polyethylene fiber fabric tape, carbon fiber fabric tape, and metallic tape.

4. The flexible tube for transporting a cryogenic fluid according to claim 1, wherein:
   the first heat insulating layer includes a layer of nonwoven fabric and the second heat insulating layer includes a layer of fiber-based nonwoven fabric containing aerogel, and
   a thickness of the second heat insulating layer is greater than a thickness of the first heat insulating layer such that the second heat insulating layer is configured to provide a greater heat insulating performance over the first heat insulating layer.

5. The flexible tube for transporting a cryogenic fluid according to claim 1, wherein a liquid permeation prevention layer is provided between the optical fiber temperature sensor and the second heat insulating layer, and the liquid permeation prevention layer is configured to reduce permeation of the cryogenic fluid into the second heat insulating layer.

6. A flexible tube for transporting a cryogenic fluid, comprising:
- a flexible corrugated metallic inner tube;
- a reinforcement layer disposed on the outer periphery of the corrugated metallic inner tube, formed by alternate winding of a reinforcement tape, and configured to reduce deformation of the corrugated metallic inner tube in an axial direction;
- a first heat insulating layer disposed on the outer periphery of the reinforcement layer;
- a second heat insulating layer disposed on the outer periphery of the first heat insulating layer and on the outer periphery of an optical fiber temperature sensor, and configured to be impermeable to water;
- the optical fiber temperature sensor disposed between the first heat insulating layer and the second heat insulating layer, and being wound spirally at a predetermined pitch; and
- a waterproof layer disposed on the outer periphery of the second heat insulating layer, wherein
- the first heat insulating layer is configured to have a greater liquid permeability than the second insulating layer such that the cryogenic fluid preferentially permeates the first heat insulating layer instead of the second heat insulating layer, and
- in response to a cryogenic fluid leak in the flexible tube, the optical fiber temperature sensor is configured to detect the cryogenic fluid permeating through the first heat insulating layer.

7. The flexible tube for transporting a cryogenic fluid according to claim 6, wherein
- the corrugated metallic inner tube is a stainless steel tube; and
- a seat layer configured to absorb unevenness of an outer circumferential surface of the corrugated metallic inner tube is disposed between the corrugated metallic inner tube and the first heat insulating layer.

8. The flexible tube for transporting a cryogenic fluid according to claim 6, wherein the reinforcement layer is formed of a tape selected from polyester fiber fabric tape, aramid fiber fabric tape, arylate fiber fabric tape, ultrahigh molecular weight polyethylene fiber fabric tape, carbon fiber fabric tape, and metallic tape.

9. The flexible tube for transporting a cryogenic fluid according to claim 6, wherein:
- the first heat insulating layer includes a layer of nonwoven fabric and the second heat insulating layer includes a layer of fiber-based nonwoven fabric containing aerogel, and
- a thickness of the second heat insulating layer is greater than a thickness of the first heat insulating layer such that the second heat insulating layer is configured to provide a greater heat insulating performance over the first heat insulating layer.

10. The flexible tube for transporting a cryogenic fluid according to claim 6, wherein a liquid permeation prevention layer is provided between the optical fiber temperature sensor and the second heat insulating layer, and the liquid permeation prevention layer is configured to reduce permeation of the cryogenic fluid into the second heat insulating layer.

* * * * *